United States Patent [19]

Friday, Jr. et al.

[11] Patent Number: 5,555,269
[45] Date of Patent: Sep. 10, 1996

[54] ERROR DETECTION FOR HVAC SYSTEMS

[75] Inventors: Arthur F. Friday, Jr.; Chi-Ping Chan, both of Liverpool, N.Y.

[73] Assignee: Carrier Corporation, Syracuse, N.Y.

[21] Appl. No.: 143,038

[22] Filed: Oct. 29, 1993

[51] Int. Cl.$^6$ .............. F25B 49/00; F28F 27/00
[52] U.S. Cl. .............. 371/5.1; 364/153; 364/185; 62/132
[58] Field of Search .............. 371/5.1; 364/514, 364/265, 153, 154, 162, 185; 165/13; 62/132

[56] References Cited

U.S. PATENT DOCUMENTS

| | | | |
|---|---|---|---|
| 3,938,017 | 2/1976 | Hayes | 318/610 |
| 4,175,283 | 11/1979 | Buchwald et al. | 364/117 |
| 4,344,128 | 8/1982 | Frye | 364/183 |
| 4,398,242 | 8/1983 | Buus | 364/183 |
| 4,509,110 | 4/1985 | Levesque, Jr. et al. | 364/153 |
| 4,542,456 | 9/1985 | Hill | 364/200 |
| 4,542,471 | 9/1985 | Inaba et al. | 364/513 |
| 4,573,115 | 2/1986 | Halgrimson | 364/138 |
| 4,616,326 | 10/1986 | Meier et al. | 364/513 |
| 4,807,150 | 2/1989 | Hobbs | 364/510 |
| 4,850,204 | 7/1989 | Bos et al. | 62/234 |
| 4,872,104 | 10/1989 | Holsinger | 364/166 |
| 4,885,676 | 12/1989 | Zweighaft | 364/178 |
| 4,935,863 | 6/1990 | Calvas et al. | 364/138 |
| 4,997,617 | 3/1991 | Newton et al. | 376/216 |
| 5,043,926 | 8/1991 | Naka et al. | 364/138 |
| 5,089,984 | 2/1992 | Struger et al. | 395/650 |
| 5,091,844 | 2/1992 | Waltz | 364/153 |
| 5,107,473 | 4/1992 | Fuji et al. | 364/32 |
| 5,119,288 | 6/1992 | Hiroi | 364/163 |
| 5,136,499 | 8/1992 | Rydborn | 364/185 |
| 5,150,367 | 9/1992 | Tong et al. | 371/23 |
| 5,161,099 | 11/1992 | Yamaguchi | 364/153 |
| 5,270,916 | 12/1993 | Sexton et al. | 364/161 |
| 5,291,190 | 3/1994 | Scuroba et al. | 364/138 |

FOREIGN PATENT DOCUMENTS

2489012  2/1982  France.
3244307  5/1984  Germany.

OTHER PUBLICATIONS

Franklin et al., *Feedback Control of Dynamic Systems*, 1986, pp. 100–103.
Astrom et al., *Computer Controlled Systems*, 1984, pp. 184–185, 368–369.
Database WPI Week 9215, Derwent Publications, AN 92-114920 & CA-A-2042 783 (Wabco Std. Tran.), Jan. 1992.
Database WPI Week 8213, Derwent Publications AN82-D666E & SU-A-840 814 (Vasilev Yui); Jun. 23, 1981.

*Primary Examiner*—Ellis B. Ramirez
*Assistant Examiner*—Patrick Assouad

[57] ABSTRACT

A process is disclosed for checking communications that a controller receives from elements in an HVAC system. The process includes storing the communications and thereafter checking each stored communication against a range of permitted values for that particular communication. The thus checked communication is made available for use by the controller only if it is within the range of permitted values. A count of times that a particular element does not comply with the check is maintained with a warning being generated in the event that the element continues to communicate unacceptable signal values.

15 Claims, 5 Drawing Sheets

CONFIGURATION MAP- CHILLER UNIT 10

| S/W VARIABLE | S/W CHANNEL | H/W CHANNEL | H/W ELEMENT |
|---|---|---|---|
| LWT | 1 | 1 | 70 |
| EWT | 2 | 2 | 62 |
| FAN1 | 3 | 3 | 40 |
| FAN2 | 4 | 4 | 38 |
| FAN3 | 5 | 0 | — |
| FAN4 | 6 | 0 | — |
| COMP_1 | 7 | 5 | 22 |
| COMP_2 | 8 | 6 | 20 |
| COMP_3 | 9 | 0 | — |
| COMP_4 | 10 | 0 | — |
| COMP_FD_BK_1 | 11 | 7 | 22 |
| COMP_FD_BK_2 | 12 | 8 | 20 |
| COMP_FD_BK_3 | 13 | 0 | — |
| COMP_FD_BK_4 | 14 | 0 | — |

CONFIGURATION MAP— CHILLER UNIT 14

| S/W VARIABLE | S/W CHANNEL | H/W CHANNEL | H/W ELEMENT |
|---|---|---|---|
| LWT | 1 | 1 | 74 |
| EWT | 2 | 2 | 68 |
| FAN1 | 3 | 3 | 54 |
| FAN2 | 4 | 4 | 52 |
| FAN3 | 5 | 5 | 50 |
| FAN4 | 6 | 6 | 48 |
| COMP_1 | 7 | 7 | 36 |
| COMP_2 | 8 | 8 | 34 |
| COMP_3 | 9 | 9 | 32 |
| COMP_4 | 10 | 10 | 30 |
| COMP_FD_BK_1 | 11 | 11 | 36 |
| COMP_FD_BK_2 | 12 | 12 | 34 |
| COMP_FD_BK_3 | 13 | 13 | 32 |
| COMP_FD_BK_4 | 14 | 14 | 30 |

FIG.3A

CONFIGURATION MAP— CHILLER UNIT 12

| S/W VARIABLE | S/W CHANNEL | H/W CHANNEL | H/W ELEMENT |
|---|---|---|---|
| LWT | 1 | 1 | 72 |
| EWT | 2 | 2 | 64 |
| FAN1 | 3 | 3 | 46 |
| FAN2 | 4 | 4 | 44 |
| FAN3 | 5 | 5 | 42 |
| FAN4 | 6 | 0 | — |
| COMP_1 | 7 | 6 | 28 |
| COMP_2 | 8 | 7 | 26 |
| COMP_3 | 9 | 8 | 24 |
| COMP_4 | 10 | 0 | — |
| COMP_FD_BK_1 | 11 | 9 | 28 |
| COMP_FD_BK_2 | 12 | 10 | 26 |
| COMP_FD_BK_3 | 13 | 11 | 24 |
| COMP_FD_BK_4 | 14 | 0 | — |

FIG.3B

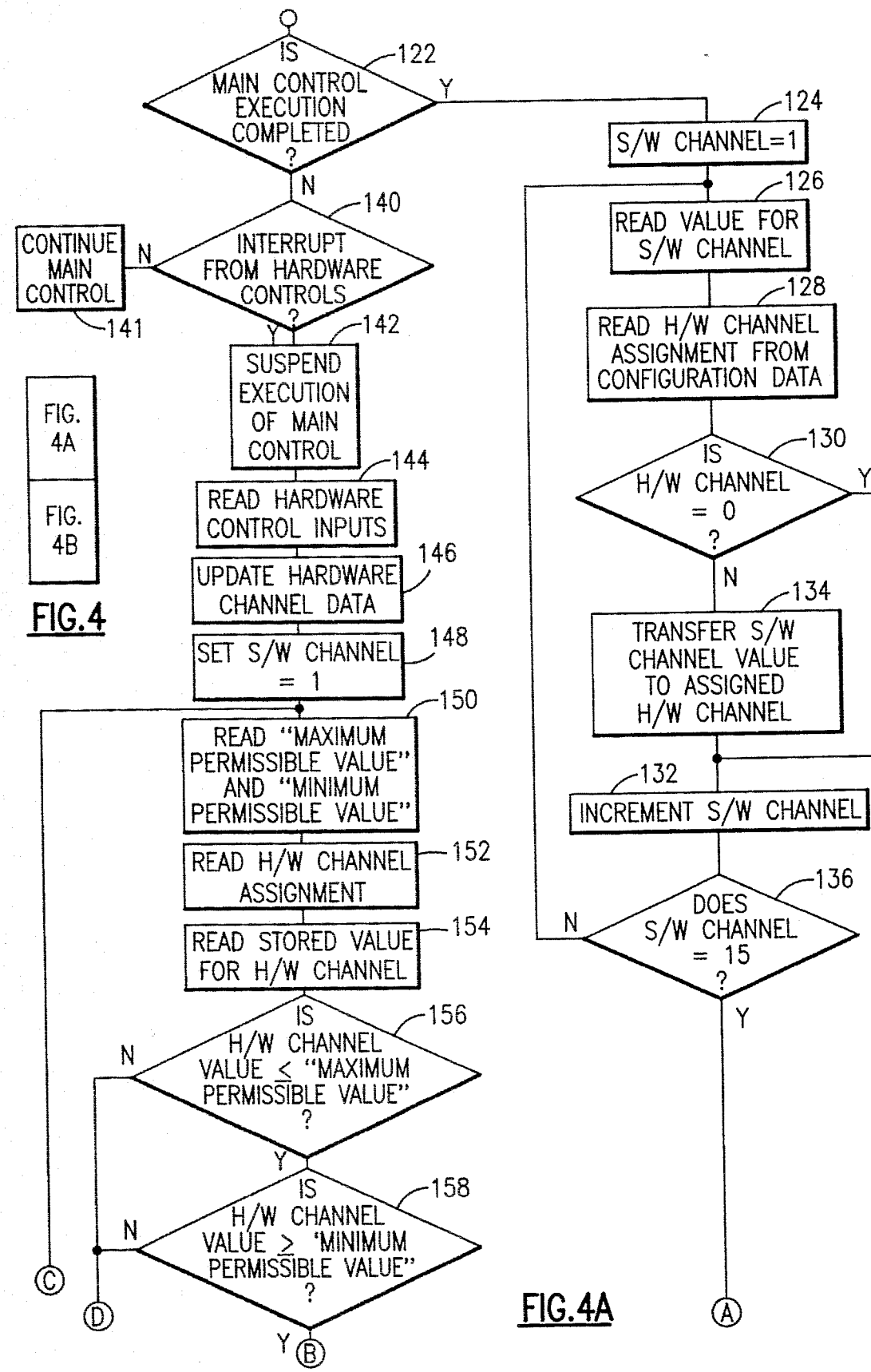

ERROR DETECTION FOR HVAC SYSTEMS

BACKGROUND OF THE INVENTION

This invention relates to the programmed control of heating and cooling systems utilizing one or more programmed microprocessors. In particular, this invention relates to the manner in which the programmed control in the microprocessors interfaces with various elements in the heating and cooling systems.

U.S. patent application Ser. No. 08/143,029, now U.S. Pat. No. 5,491,649, entitled, "Configuration Control for HVAC Systems" filed in the names of Arthur Friday, Jr., Chi-Pin Chan and Brett Desmarais discloses a programmed microprocessor control system having separate hardware and software interfaces. The hardware interface defines communication channels to the hardware elements of an HVAC system that are to perform heating or cooling functions. The software interface defines a number of software variables present in a control program residing in the microprocessor. Configuration data stored in memory associated with the microprocessor maps at least some of these software variables to the communication channels defined by the hardware interface. Further software utilizes the configuration data so as to allow information to be transferred between the interfaces.

The above transfer of information between the interfaces does not take into account the possibility of erroneous information coming from one of the hardware elements to the hardware interface. In this regard, a particular hardware element may not necessarily be functioning properly or the communication link from the element might be temporarily experiencing difficulty. In either case it may not be advisable to further transfer the communicated value from the hardware interface to the software interface. It may also not be advisable to continue operation in the event of a serious problem having arisen at the hardware control element.

OBJECTS OF THE INVENTION

It is an object of the invention to provide an HVAC system with the capability of avoiding the transfer of questionable values received from hardware elements of the system to the programmed control portion of the system.

It is another object of the invention to provide an HVAC system with the capability of reacting to any detection of questionable values received from hardware elements of the system.

SUMMARY OF THE INVENTION

The above and other objects of the invention are achieved by providing a programmed microprocessor within an HVAC system that reads and stores values communicated from hardware elements in the HVAC system. The thus read values are checked against permissible ranges of value for these elements. The checked values are transferred to another set of storage locations when each value is within the range of permitted values for that particular hardware element. The values stored in the second set of storage locations are accessed by the program control for use in the control of the HVAC system. When a checked value is not within the range of permitted values, an error is denoted and a count is begun of the number of successive times the hardware element value is found to be in error. When the error count reaches a predetermined count, a warning is generated as to the continuing error.

BRIEF DESCRIPTION OF THE DRAWINGS

Other objects and advantages of the present invention will be apparent from the following description in conjunction with the accompanying drawings in which:

FIG. 2 illustrates a microprocessor configuration for one of the control units of FIG. 1;

FIGS. 3A–3C illustrate configuration data for each of the control units of FIG. 1; and FIGS. 4A and 4B illustrate a configuration program executed by each microprocessor within a control unit of FIG. 1.

DESCRIPTION OF THE PREFERRED EMBODIMENT

Figure 1:
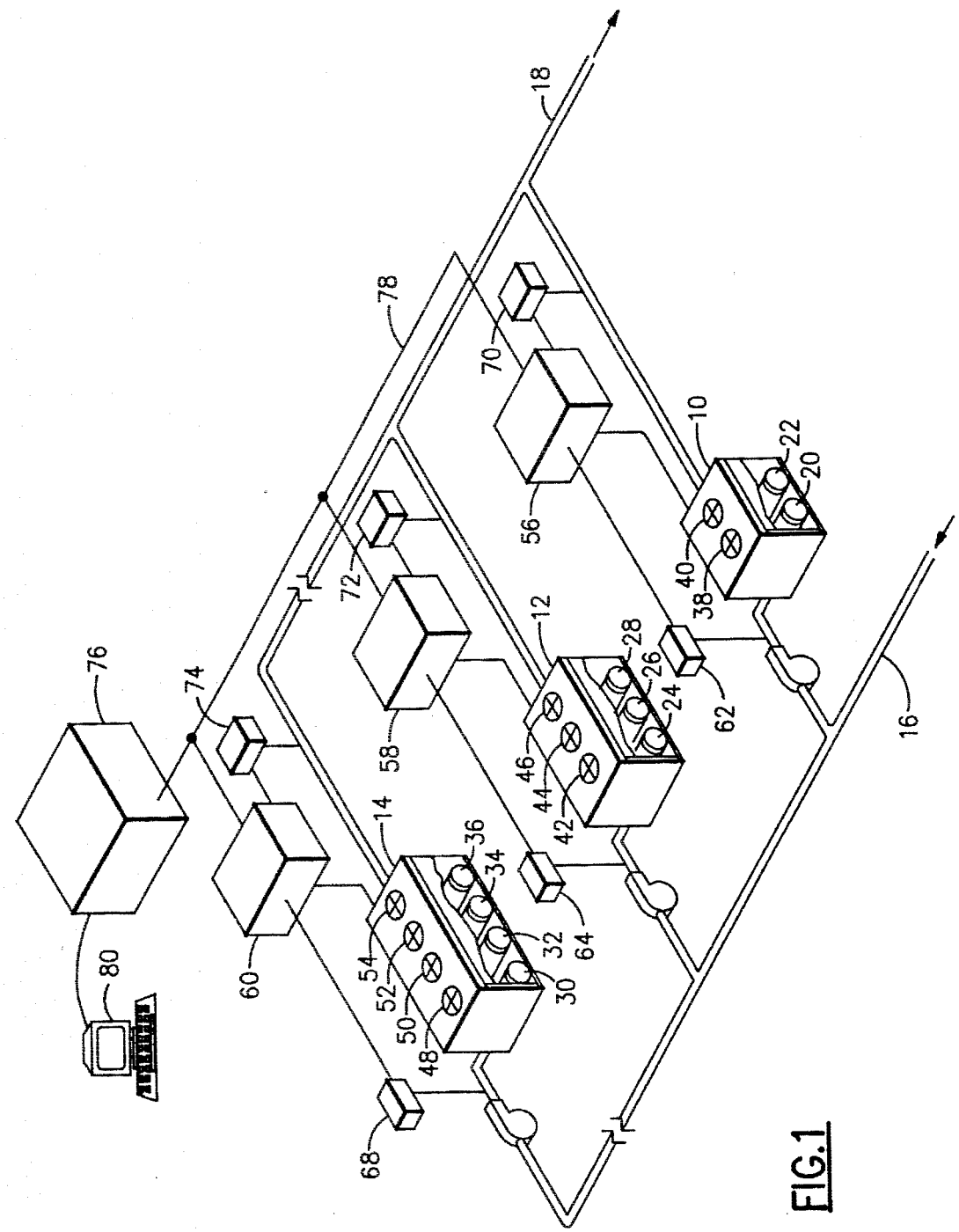
FIG. 1 illustrates a plurality of individually controlled chiller units each having a plurality of compressor stages and fan units operating under the control of respective control units.

Referring to FIG. 1, a number of parallel chiller units 10, 12, and 14 are illustrated relative to a coolant return line 16 and a coolant supply line 18. The coolant circulates through a series of heat exchangers (not shown) which effectively cool one or more spaces. The coolant returns to the system via the coolant return line. The coolant will hereinafter be referred to as chilled water although it should be understood that the system would work equally well with other coolants. The chiller units 10, 12, and 14 are typically required to maintain the leaving coolant at the same temperature.

Each of the chiller units is seen to include individual compressor stages such as 20 and 22 for chiller unit 10; 24, 26 and 28 for chiller unit 12; and 30, 32, 34 and 36 for chiller unit 14. Each of the chiller units also includes fans such as 38 and 40 for chiller unit 10; 42, 44, and 46 for chiller unit 12; and 48, 50, 52 and 54 for chiller unit 14. The compressor stages and fans in each respective chiller unit are individually controlled by a unit controller such as 56 for chiller unit 10, 58 for chiller unit 12, and 60 for chiller unit 14. Each unit controller receives an entering water temperature from a respective entering water temperature sensor 62, 64, or 68. Each unit controller also receives a leaving water temperature from a respective leaving water temperature sensor 70, 72 or 74. It is to be understood that each unit controller activates the number of compressor stages within the chiller unit so as to achieve a desired leaving water temperature for its respective branch of the system of FIG. 1. This local control may be in accordance with any number of well known control methods for activating or deactivating compressors and associated fans in order to achieve the desired leaving water temperature. In addition to controlling the respective chiller unit, each unit controller communicates with a system controller 76 via a communication bus 78.

The system controller 76 downloads control programs into the respective unit controllers 56, 58, and 60 via the communication bus 78. These control programs each contain the same algorithms for the control of the fans and compressors in each chiller unit. The downloaded control programs are configured for each chiller unit by separately loaded configuration data for each unit controller. As will be explained in detail hereinafter, the separately loaded configuration data defines relationships between the software variables in the control program common to each unit controller and the actual hardware elements that are to be controlled in each chiller unit. This allows the common control program in each unit controller to execute without regard to the actual number of fans and compressors in each chiller unit. It is to be noted that the downloading of the various software modules to the individual unit controllers can be done in response to commands from a user interface 80 associated with the system controller 76.

Figures 2, 3C:
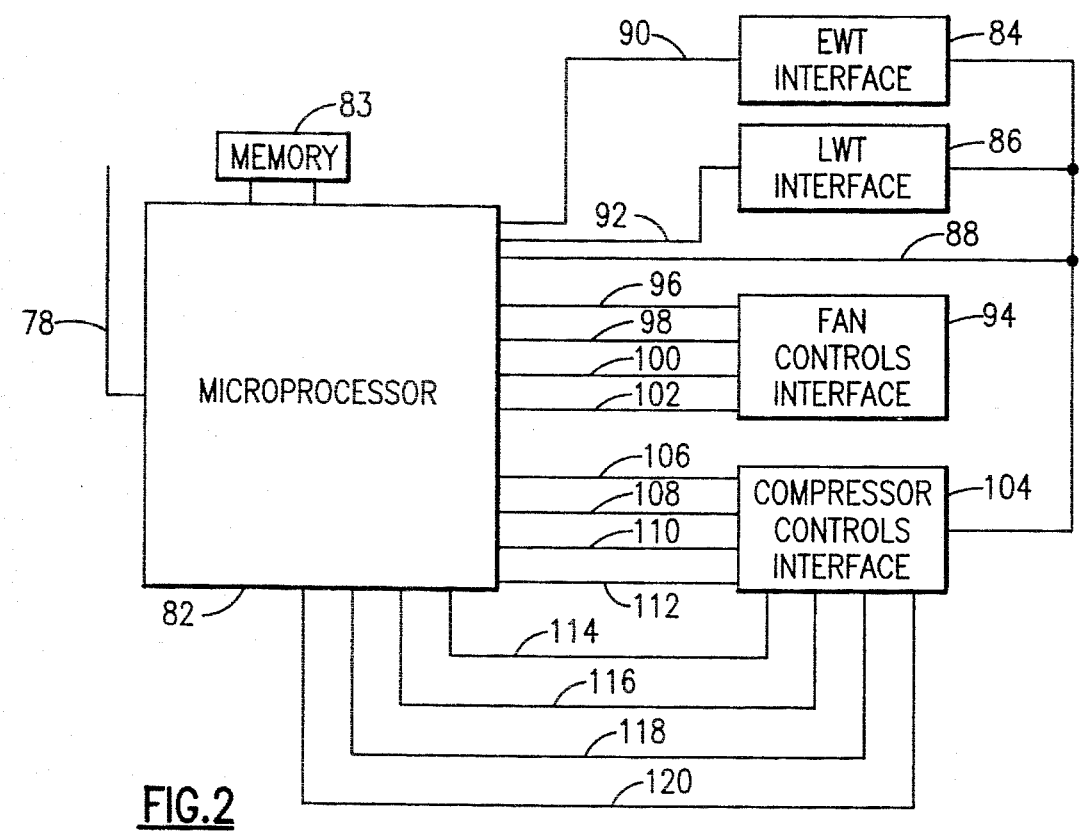

FIG. 2 illustrates a unit controller in further detail. Each unit controller includes a programmed microprocessor 82 which receives the downloaded software from the system controller 76 via the communication bus 78. The downloaded software is stored in a memory 83 for execution by the microprocessor. The microprocessor 82 furthermore communicates with various digital to analog interfaces illustrated in FIG. 2. In particular, the microprocessor 82 receives temperature information from either an entering water temperature interface 84 or a leaving water temperature interface 86. It is to be appreciated that each interface is connected to a leaving water temperature sensor or an entering water temperatures sensor for the particular control unit. Each interface is operative to produce an interrupt signal over an interrupt communication line 88 when a temperature update is to be provided to the microprocessor 82. The microprocessor is operative to read the temperature value via a hardware input line 90 or 92.

The microprocessor is also connected to a fan control interface 94. The fan control interface 94 receives output signals from the microprocessor over the lines 96, 98,100, and 102 which activate respective fans in a chiller unit through the fan control interface 94. The microprocessor also is interconnected to a compressor control interface 104 via a set of output lines 106, 108, 110 and 112 as well as a set of feedback lines 114, 116, 118 and 120. The compressor control interface 104 is operative to send an interrupt signal over the line 88 to the microprocessor 82 in the event that a feedback to the microprocessor 82 is in order. The compressor control interface will otherwise receive output signals from the microprocessor 82 via the lines 106 through 112.

It is to be appreciated that each of the interfaces 84, 86, 94 and 104 are directly connected to the corresponding hardware elements in FIG. 1. As has been previously noted, the number of hardware elements to which the unit controller connects will vary depending on the chiller. In this regard, both chiller units 10 and 12 have less fans and less compressors than chiller unit 14. This will mean less active connections to fans and compressors by the fan control interface 94 and the compressor control interface 104 in the unit controllers 56 and 58 for chiller units 10 and 12 versus the unit controller 60 for the chiller unit 14.

Notwithstanding the number of active connections to individual fans and compressors, each unit controller will preferably include the same type of microprocessor having the same control program stored in its memory. The control program will have a complete set of software variables that govern the control of the maximum number of temperature sensors, fans and compressors. In order for the control program to control various numbers of sensors, fans and compressors, configuration data is provided by the system controller 76 to the microprocessor 82. This configuration data is stored for use in the local memory 83. Referring to FIG. 3A, the configuration data for the chiller unit 14 is illustrated in detail. The configuration data is seen to include a column of software variables which includes leaving water temperature LWT, entering water temperature EWT, fan software control variables labeled FAN1 to FAN4, compressor control variables COMP_1 through COMP_4 and COMP_FD_BK_1 through COMP_FD_BK_4. Each of the software variables is denoted by a particular software channel index number. Each software channel index number is in turn related to a hardware channel index number. The hardware channels correspond to the various connecting lines to the various interfaces 84, 86, 94 and 104 in FIG. 2 which in turn connect to specific hardware elements such as is shown in FIG. 3A. For example, hardware channel one for the leaving water temperature sensor 74 is line 92 in FIG. 2. This hardware channel is mapped to the software channel one denoting the software variable LWT. In similar fashion, the compressor control 36 has input lines 106–112 corresponding to the hardware channel lines seven through ten that are mapped to the software channels seven through ten identifying the compressor variables COMP_1 through COMP_4.

Referring to FIG. 3B, the configuration data for the chiller unit 12 is illustrated in detail. It will be remembered that the chiller unit 12 does not contain a fourth fan or a fourth compressor. The hardware channel index assignments for the fourth fan control variable FAN4, and the compressor variables COMP_4 and COMP_FD BK_4, are all numerically coded with a value of zero. Furthermore, beginning with the software variable COMP_1, the numerical value of the hardware channel index assignment does not directly correspond with the numerical value of the software channel index assignment. This means that the software channel index numbers will map to different hardware channel index numbers from this point.

Referring to FIG. 3C, the configuration data for the chiller unit 10 even further departs from a direct correspondence between the numerical value of the hardware channel index and that of the software channel index. In particular, since the chiller unit 10 has only two fan controls and two compressors, the hardware channel indexes for the third and fourth fans as well as the third and fourth compressors are all equal to zero. It is hence to be appreciated that the control program executing in the unit controller 56 associated with the chiller unit 10 will have significantly less non-zero hardware channel indexes than the unit controllers 58 and 60.

As has been previously noted, the configuration data for each respective chiller unit is loaded into the memory 83 associated with the microprocessor 82 of the corresponding unit controller. The configuration data is preferably organized in two ways in memory. First, storage locations are set aside for each software channel index along with the value for the particular software variable represented by the software channel index and the corresponding hardware channel index number. Secondly, storage locations are set aside for each hardware channel index along with the current values that have been either communicated to or received from the appropriate analog to digital interfaces for that hardware channel index. The software channel index number is also stored in a storage location linked to the hardware channel index number. In this manner, a search query can be made by either set of index numbers to find the appropriate configuration data.

Figure 4B:
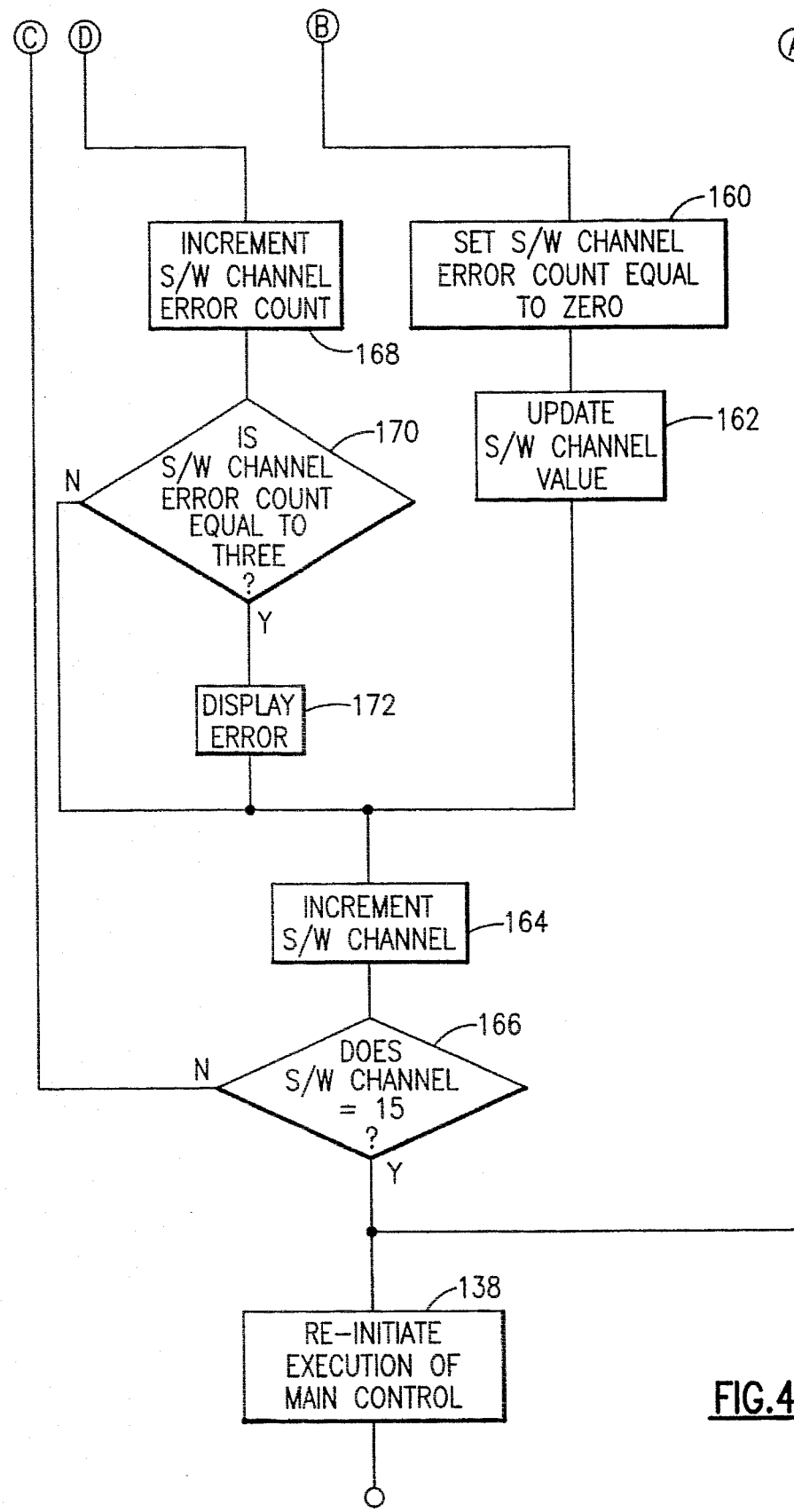

Referring to FIG. 4A, a program utilizing the stored configuration data is illustrated in detail. This program begins with a step 122 wherein the question is asked as to whether the control program execution is complete. It is to be appreciated that the control program will normally cause the microprocessor to calculate various values of the software control variables during execution. Completion of these calculations will result in the microprocessor exiting from the step 122 to a step 124 and setting a software channel index equal to one. The value of the software variable corresponding to this software channel index is read in a step 126. The hardware channel index assignment for the software channel index is next read in a step 128. The thus read hardware channel index is checked for being equal to zero in step 130. In the event that the hardware channel assignment is equal to zero, the microprocessor proceeds from step 130 to a step 132 and increments the software channel index by one. In the event that the hardware channel index is not equal to zero, the microprocessor proceeds to a step 134 and transfers the software channel value read in step 126 to a storage location in memory 83 associated with the assigned hardware channel identified in step 128. The software channel is thereafter incremented in step 132. The thus incremented software channel index is checked for being equal to fifteen in a step 136. It is to be appreciated that the value for each software channel index will be successively read and transferred to a storage location in memory 83 associated with the assigned hardware channel index. This will continue until the software channel index is incremented from fourteen to fifteen in step 132. When this occurs, the microprocessor will proceed out of step 136 to a step 138 and reinitiate execution of the control program for the particular chiller unit. At this time, the control program will again calculate any values for the software variables associated with the various software channel indexes. At the same time, each of the interfaces 84, 86, 94 and 104 will have access to the updated hardware channel values stored in the memory 83 for use by the respective hardware elements.

Referring to FIG. 2, it will be remembered that an interface may generate an interrupt signal on the line 88 when it wishes to communicate with the microprocessor 82. This may occur at anytime during execution of the control program.

Referring to FIG. 4A, the status of line 88 is continuously monitored during control program execution by a step 140. When no interrupt is noted, the microprocessor simply continues to execute the control program as noted in step 141. When an interrupt is received from one of the interfaces, the microprocessor will proceed to a step 142 and suspend execution of the control program. Suspension of the control program is done in a manner which allows the control program to complete execution of any particular series of steps that are necessary before termination. This would include for instance performing a complete calculation of the value of a particular software variable and storing the results thereof before terminating control. When the control program has signaled that it has completed its termination procedure, the microprocessor will proceed to a step 144 and read the hardware control input signal lines. These would be the signal lines associated with the leaving water temperature sensor, entering water temperature sensor, and the feedback signals from the individual compressors within the given chiller unit. For instance, the feedback signal for compressor number one in chiller unit 14 would be stored in a storage location associated with the hardware channel index eleven whereas the same first compressor feedback signal value would be stored in a storage location associated with hardware channel index nine for chiller unit 12 and in a storage location associated with hardware channel index seven for chiller unit 10. Following the updating of all hardware channel input data, the microprocessor will proceed to a step 148 and set the software channel index equal to one. The microprocessor will next read the maximum and minimum permissible values allowed for the particular software channel index in a step 150. These values are preferably stored in association with the given software channel index. The hardware channel index assigned to the software channel index will thereafter be read in a step 152. The hardware data value stored in association with this hardware channel index is subsequently read in a step 154. The hardware data value read in step 154 is next compared with the maximum permissible value in step 156 and the minimum permissible value in a step 158. In the event that the hardware data value is within the range defined by the maximum and minimum permissible values, the microprocessor will proceed to a step 160. Referring to step 160, the software channel error count for the particular software channel index will be set equal to zero. The software channel data value will thereafter be updated in a step 162 by reading the value stored under the hardware channel index and storing that value under the corresponding software channel index. The software channel index will next be incremented in a step 164 and inquiry will be made in a step 166 as to whether the software channel index equals fifteen. If there are further software channel data values to be updated, the microprocessor will proceed along the "no" path from step 166 back to step 150 and begin again the process of reading and storing the appropriate software and hardware channel values and inquiring as to whether the hardware channel data value is within permissible deviation before transferring the same as the new software data value. Following the updating of all software channel input data, the microprocessor will proceed to step 138 and again reinitiate execution of the control program. Execution within the control program will normally begin at the point where the control was previously interrupted.

Referring again to step 156 and 158, when the hardware data value is not within the range defined by the maximum and minimum permissible values, the microprocessor will proceed along a "no" path out of either step 156 or 158 to a step 168 and increment the software channel error count. The software channel error count for each channel is initially set equal to zero when the configuration data is downloaded into each unit controller. These software channel error counts are also set equal to zero in step 160 if the next reading of the hardware channel value is within the range of permissible values. As a result, the only time a software channel error count can reach three is if three successive readings of the particular hardware channel data are outside the range of permitted values.

Referring to step 170, if the software error count has been incremented to three in step 168, the microprocessor will proceed to a step 172 and alert the system controller 76 to display an error on the user interface 80 relative to the particular chiller unit. The operator can take appropriate action based on this communication. In the mean time, the microprocessor will exit from step 172 and increment the software channel index in step 164 and then inquire as to whether all software channel indexes have been incremented in step 166.

Referring again to step 170, when the software error count has not reached three, the microprocessor will simply proceed to step 164 and thereafter to step 166. It is to be appreciated that regardless of error count, the particular software channel will not be updated if the hardware data value stored in the hardware index is not within the range of permitted values for that hardware channel value.

When all hardware channel data values have at least been checked and the corresponding software channel data either updated or not, the microprocessor will exit from step 166 to step 138 and reinitiate execution of the control program pending any further interrupt of the microprocessor either by the line 88 or through a communication from the system controller 76 via the communication bus 78 as a result of reading the displayed error. In the latter event, the system controller 76 will respond to appropriate commands provided at the user interface if the displayed error is deemed critical to the continued operation of the system.

It is to be appreciated that a particular embodiment of the invention has been described. Alterations, modifications, and improvements thereto will readily occur to those skilled in the art. For example, permissible ranges for hardware elements will depend on the particular parameter being measured or sensed. These ranges may even change depending on the level of the particular parameter at any point in time. Such ranges could be accessed by noting what the currently used parameter value is and what the permissible range would be from that value. Such alterations, modifications, and improvements are intended to be part of this disclosure even though not expressly stated herein. Accordingly the foregoing description is by of example only. The invention is limited only as defined in the following claims and the equivalents thereto.

What is claimed is:

1. A process executable by a processor within a control unit of a heating or cooling system, the processor being responsive to values of electronic signals received from elements of a heating or cooling system electronically connected to the control unit, said process comprising the steps of:

storing an electronic signal value of an electronic signal received from at least one particular electronically connected element in a storage location set aside within a memory associated with the processor for storing the value of electronic signal received from the particular element;

comparing the stored value of the electronic signal received from the particular element with a range of electronic signal values permitted for the particular element;

transferring the stored value of the electronic signal received from the particular element to a different storage location when the stored value of the electronic signal received from the particular element is within the range of permitted electronic signal values for the particular element; and using the value of the electronic signal received from the particular element within a control program executable by the processor so as to control the heating or cooling system only when the value of the electronic signal received from the particular element has been transferred to the different storage location for use within the control program.

2. The process of claim 1 wherein said step of comparing the stored value of the electronic signal received from the particular element with a range of permitted electronic signal values for the particular element comprises the steps of:

accessing the maximum and minimum values permitted for the electronic signal received from the particular element; and comparing the value of the electronic signal received from the particular element with the maximum and minimum electronic signal values permitted for the electronic signal received from the particular element.

3. The process of claim 1 further comprising the steps of:

noting when the comparing step indicates that a stored value of the electronic signal received from the particular element is not within the range of permitted electronic signal values for the particular element; and exiting from the process without triggering said step of transferring the stored value of electronic signal received from the particular element.

4. The process of claim 1 wherein said step of storing an electronic signal value of an electronic signal received from at least one particular electronically connected element and said step of comparing the stored value of the electronic signal received from the particular element are repeated and wherein said process further comprises the step of:

counting the number of successive comparisons made of the stored electronic signal value of the electronic signal received from the particular element that indicate the value of the electronic signal received from the particular element is not within the range of permitted electronic signal values for the particular element.

5. The process of claim 4 further comprising:

generating a warning when the count of successive comparisons made of the stored values of the electronic signal received from the particular element reaches a predetermined number.

6. The process of claim 1 wherein the the control program includes a plurality of control variables that are related to the elements of the heating or cooling system electronically connected to the control unit and wherein said step of transferring the stored value of the electronic signal received from the particular element to a different storage location comprises the steps of:

identifying a control variable that is related to the particular element; and transferring the value of the electronic signal received from the particular element to a storage location associated with the identified control variable for subsequent use by the control program when the stored value of the electronic signal received from the particular element is within the range of permitted electronic signal values for the particular element.

7. The process of claim 6 wherein said step of comparing the stored value of electronic signal received from the particular element with a range of electronic signal values permitted for the particular element comprises:

identifying a control variable that is related to the particular element;

accessing the maximum and minimum values permitted for the electronic signal received from the particular element from storage locations associated with the identification of the control variable; and comparing the value of the electronic signal received from the particular element with the accessed maximum and minimum values for the electronic signal received from the particular element.

8. The process of claim 7 wherein said step of storing an electronic signal value of an electronic signal received from at least one particular electronically connected element and said step of comparing the stored value of the electronic signal received from the particular element are repeated and wherein said process further comprises the steps of:

noting when the comparing step indicates that a stored value is not within the range of permitted electronic signal values for the element; and exiting from the process without triggering said step of transferring the previously stored value of electronic signal received from the particular element.

9. The process of claim 7 further comprising the step of:

counting the number of successive comparisons made of the stored electronic signal value of the electronic signal received from the particular element that indicate the value of the electronic signal received from the particular element is not within the range of permitted electronic signal values for the particular element.

10. The process of claim 9 further comprising the step of:
generating a warning when the count of successive comparisons made of the stored value of the electronic signal received from the particular element reaches a predetermined number.

11. The process of claim 7 wherein the plurality of control variables are related to the elements electronically connected to the control unit by configuration data stored for use by the processor and wherein said step of identifying a control variable that is related to the particular element comprises the step of:
accessing the configuration data to identify the particular control variable that is related to the particular element.

12. The process of claim 6 wherein the processor receives electronic signal values from the electronically connected elements via identifiable communication channels and wherein said step of storing an electronic signal value of an electronic signal received from a particular element in a storage location set aside within a memory associated with the processor for storing the value of the electronic signal received from the particular element comprises the steps of:
identifying the communication channel for the particular element; and
storing the value of the electronic signal received from the particular element in a storage location associated with an identification of the communication channel.

13. The process of claim 6 wherein the plurality of control variables are related to the elements electronically connected to the control unit by configuration data stored for use by the processor and wherein said step of identifying a control variable that is related to the particular element comprises the step of:
accessing the configuration data to identify the particular control variable that is related to the particular element.

14. The process of claim 6 wherein the elements of the heating or cooling system electronically connected to the control unit include temperature sensors and wherein the electronic signal value that is stored, compared and transferred is a temperature value and wherein the control variable that is identified is a temperature variable within the control program that is used by the control program to compute values of other control variables dependent on the value of the temperature variable.

15. The process of claim 1 further comprising the step of:
using within the control program a value presently stored in the different storage location when the value of the electronic signal stored in the storage location set aside within the memory associated with the processor is not within the range of permitted electronic signal values for the particular control element.

* * * * *